Figure 1:
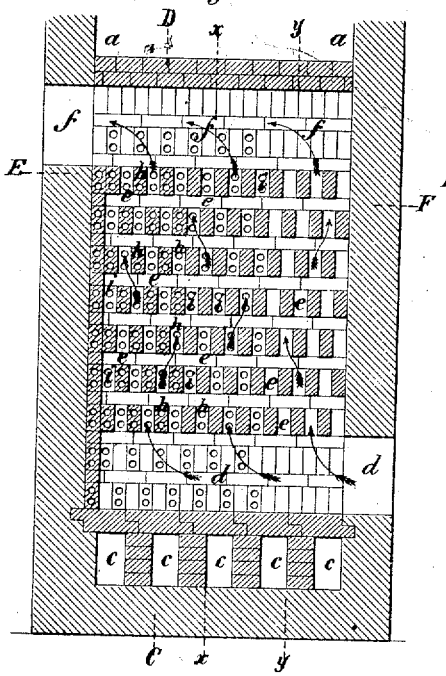

A. PONSARD.

Regenerators for Metallurgic Furnaces.

No. 6,107. Reissued Oct. 27, 1874.

Witnesses:

Theodore Bergner.

Coleman Sellers

A. Ponsard.

Inventor.

by Henry Baldwin Jr.

Attorney.

UNITED STATES PATENT OFFICE.

AUGUSTE PONSARD, OF PARIS, FRANCE, ASSIGNOR TO WILLIAM SELLERS, OF PHILADELPHIA, PENNSYLVANIA.

IMPROVEMENT IN REGENERATORS FOR METALLURGIC FURNACES.

Specification forming part of Letters Patent No. 130,313, dated August 6, 1872; reissue No. 6,107, dated October 27, 1874; application filed August 7, 1874.

*To all whom it may concern:*

Be it known that I, AUGUSTE PONSARD, of the city of Paris, in the Republic of France, have invented certain new and useful improvements in Heat-Restorers Applicable to Metallurgic and other Furnaces, of which the following is a specification:

My invention relates to furnaces, in operating which the products of combustion are applied to heat air, which supports the combustion, so that the increased temperature of the air is accumulated upon the furnace. This system of furnaces I denominate "recuperative," and the special apparatus required for the purpose I designate as "recuperators."

My invention consists in an improved recuperator, the object of which is, first, to avoid the use of valves for alternating the currents of air and the products of combustion; second, to avoid the alternations themselves, which are intermissions, and produce corresponding variations of temperature in the furnace; third, to obtain a uniform temperature and the highest heat; fourth, to obtain a larger recuperative surface within a smaller compass than heretofore, thereby diminishing wasteful radiation and reducing the cost of construction.

The recuperator which I have constructed to carry out these objects is composed of a series of parallel vertical walls, which divide it into a series of passages or chambers, through some of which the products of combustion pass continuously from the furnace, while through the others the air to be heated passes continuously to the furnace, these chambers being alternated, so that each air-chamber may be interposed between two chambers for products of combustion. To enhance the efficiency of the recuperator I retard the currents of products of combustion and air by checks or traverses, which also serve to increase the surface for absorbing and transmitting the heat, and to still further increase this surface I make these checks hollow, so as to establish through them a communication between two chambers across an intervening one. As circumstances dictate, all of these checks may be made solid, or all may be made hollow; or some may be made solid and others hollow.

In the accompanying drawings forming part of this specification, I have shown the recuperator constructed of rectangular bricks. The composition of these bricks may be varied with varying circumstances; and when very high temperatures are to be employed, those in the upper portion must be of the most refractory materials, but this quality may be reduced toward the lower and cooler portion of the apparatus.

Figure 2:
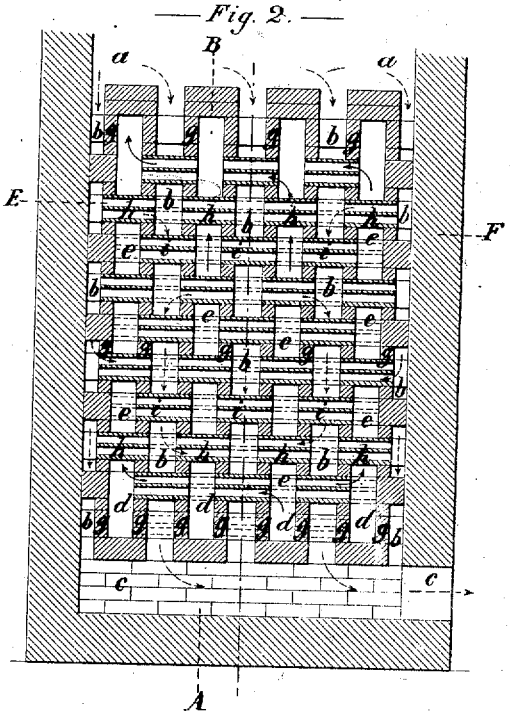
Figure 3:
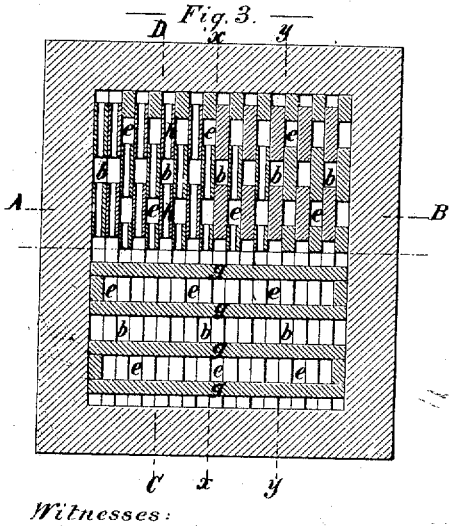

Figure 1 of the drawing is a vertical section in the plane indicated by the line A B in Figs. 2 and 3. Fig. 2 is a vertical section at right angles to Fig. 1, in the plane indicated by the line C D in Figs. 1 and 3. Fig. 3 is a horizontal section in the plane indicated by the line E F in Figs. 1 and 2.

Similar letters of reference indicate corresponding parts in the several figures.

*a* is the inlet of the hot products of combustion, extending over the whole area of the top of the structure. *b b* are the vertical passages or chambers, open at top and bottom, through which the products of combustion descend to the outlets *c c* at the bottom of the structure, whence they escape to the chimney. *d d* are the cold-air inlets, situated near the bottom of the structure, and communicating laterally with the vertical air passages or chambers *e e*, which are closed at top and bottom, and provided with outlets *f f* near the top of the structure, whence the air, after having been heated in said chambers or passages, passes out to the fire-place of the furnace, or to any other place where the heated air is to be used. *g g* in Figs. 2 and 3 are the vertical partition-walls, which separate and form the respective passages or chambers. The dotted arrows in Figs. 1 and 2 indicate the downward course of the products of combustion through the passages or chambers *b b*, and the black arrows in the same figures indicate the upward course of the air through the passages or chambers *e e*. An inspection of the part on the left-hand side of line *x x* in Figs. 1 and 3 shows the chambers or passages *b b* communicating together laterally by means of hollow bricks *h h*, which are arranged across and form checks or traverses within the air chambers or passages *e e*, and also that the air chambers or passages *e e* communicate together by means of hollow bricks *i i*, which are arranged across and form checks within the chambers or passages *b b*. It results from this arrangement that the products of combustion heat in their course not only the partition-walls at the sides of the passages or chambers *b b*, but also the exteriors of all the hollow bricks *i i*, through the interiors of which the air passes between the chambers *e e*, as well as the interiors of all the hollow bricks *h h*, which form communications between the passages *b b*, and which form the checks within the passages *e e*.

In the portion of the apparatus included between the lines *x x* and *y y*, Figs. 1 and 3, only the bricks across the passages *b b* are shown hollow, those crossing the air-passages being made solid. In the portion of the apparatus to the right of the line *y y* all the bricks which cross the passages to form the checks are represented as solid.

What I claim as my invention, and desire to secure by Letters Patent, is—

1. A recuperator divided vertically into passages for the products of combustion, alternating with passages for the air to be heated, the products of combustion and the air passing continuously and in opposite directions, substantially as and for the purposes described.

2. A recuperator divided vertically into passages for the products of combustion, alternating with passages for the air to be heated, said passages being interrupted by checks or traverses, substantially as and for the purposes described.

3. A recuperator divided vertically into passages for the products of combustion, alternating with passages for the air to be heated, said passages being interrupted by hollow checks or traverses, substantially as and for the purposes described.

A. PONSARD.

Witnesses:
ROBT. M. HOOPER,
HENRI VASLIN.